United States Patent

Holbus

[11] Patent Number: 5,921,602
[45] Date of Patent: *Jul. 13, 1999

[54] ENVIRONMENTAL DRIP PAN

[76] Inventor: Edward Holbus, 1822 South St., Racine, Wis. 53404

[21] Appl. No.: 08/918,414
[22] Filed: Aug. 26, 1997

Related U.S. Application Data

[60] Provisional application No. 60/025,813, Sep. 4, 1996.

[51] Int. Cl.[6] ................................................. F16W 31/00
[52] U.S. Cl. .................................................. 296/38
[58] Field of Search .................................... 296/38

[56] References Cited

U.S. PATENT DOCUMENTS

| | | | |
|---|---|---|---|
| 4,750,775 | 6/1988 | Miller | 296/38 |
| 4,875,537 | 10/1989 | Garnatz et al. | 296/38 |
| 5,501,290 | 3/1996 | Volz et al. | 296/38 |
| 5,526,900 | 6/1996 | Mason | 296/38 |
| 5,711,402 | 1/1998 | Sumpter | 296/38 |

FOREIGN PATENT DOCUMENTS 3905252  9/1990  Germany ................................. 296/38

Primary Examiner—Gary C. Hoge
Attorney, Agent, or Firm—Quarles & Brady

[57] ABSTRACT

A drip pan is removably mounted beneath the engine compartment of a motor vehicle. The pan contains a layer of nylon filter material, such as a nylon flannel, that absorbs oils and chemicals but releases water. A perforated screen is mounted over the filter layer.

5 Claims, 1 Drawing Sheet

ENVIRONMENTAL DRIP PAN

This application claims the benefit of Provisional Application No. 60/025,813 filed Sep. 4, 1996.

BACKGROUND OF THE INVENTION

This invention relates to drip pans, and particularly to a pan for attachment to the underside of a vehicle for collecting and retaining drippings.

Large amounts of oils, vehicle fluids, metal particles, and other unsightly and hazardous substances are deposited daily onto the nation's streets, roads, highways, and parking surfaces from cars and trucks. These substances are washed into the nation's waterways or are evaporated into the air. They deteriorate the surfaces on which they collect.

It has been proposed in the past to mount a pan under the engine of a vehicle to collect the drippings. An example is found in U.S. Pat. No. 3,651,884 issued Mar. 28, 1972, for "Oil Drip Guard". While the drip guard of this patent will collect drippings, it contains no mechanism to retain those drippings.

SUMMARY OF THE INVENTION

In accordance with the invention, I provide a pan for attachment to the underside of a vehicle engine or other point on a vehicle where undesirable drippings are generated. The pan contains a layer of a filter material, such as a nylon flannel, which retains oils, organic and inorganic chemicals, and metals, but will release water. The filter material is held in place in the pan by a removable screen. The filter material can be removed and discarded periodically.

The foregoing and other objects and advantages of the invention will appear in the detailed description which follows. In the description, reference is made to the accompanying drawings which illustrate a preferred embodiment of the invention.

DETAILED DESCRIPTION OF THE INVENTION

Figure 1:
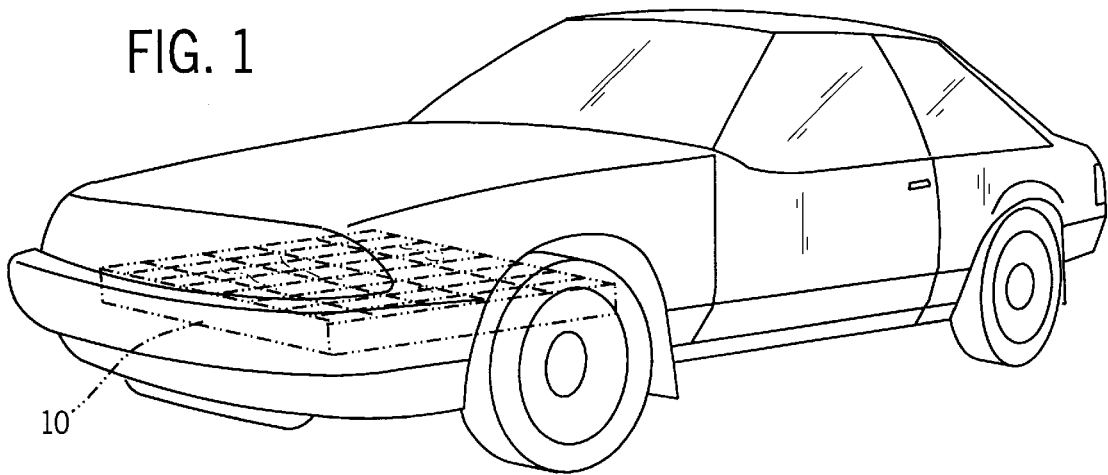
FIG. 1 is a view in perspective of an automobile with a pan in place beneath the engine compartment.

Referring to the drawings, the pan 10 may take the form of an open top rectangular box removably mounted to the underside of the engine 12 by brackets 14. The brackets may be attached to the walls of the engine compartment of the vehicle. Alternately, the pan 10 may be attached to the underside of the engine in the manner shown in U.S. Pat. No. 3,651,884.

Figure 2:
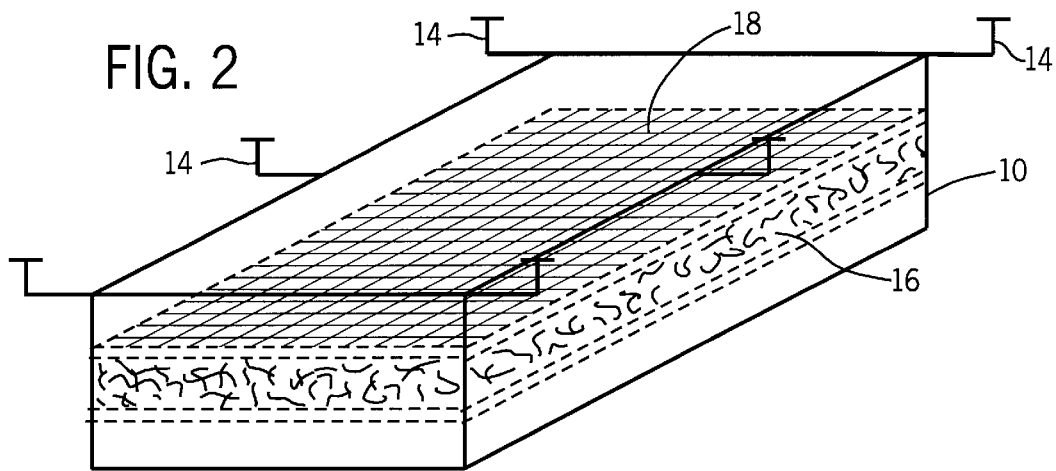
FIG. 2 is a stylized view in perspective of the pan.
Figure 3:
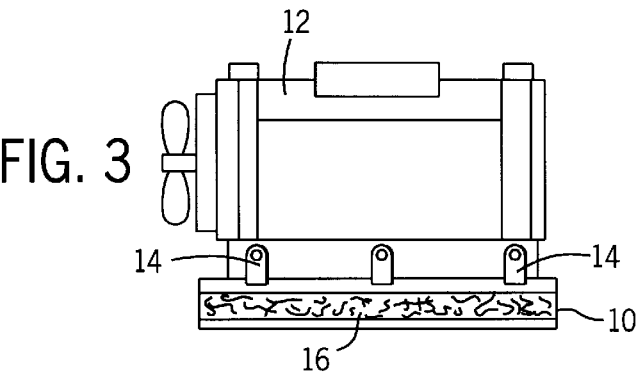
FIG. 3 is a side view in elevation showing the pan attached beneath the automobile engine.

The pan 10 receives a layer 16 of filter material which may be placed on the bottom of the pan, or, as shown in FIG. 2, spaced slightly above the bottom of the pan. A screen 18 is mounted in the pan 10 above the layer 16 of filter material.

The filter material is preferably formed of nylon fibers. A nylon padding or flannel is preferred. A preferred material is a nylon flannel marketed under the trademark "Spring Bak" and made by Southern Mills, Inc., Union City, Ga. 30291. This material is an excellent filter for oils, halogen compounds, and fatty acids, which it will trap. The material sheds water rapidly.

In operation, the drippings from the engine 12 will be collected in the pan 10 and retained therein in the layer 16 of filter material. The drippings can pass through the screen 18. Periodically, the pan 10 is removed from the engine, and the filter layer 16 is removed, discarded, and replaced with a fresh layer of filter material.

Although the pan is shown mounted beneath the engine, similar pans could be mounted beneath other points of a vehicle, such as the transmission, where dripping may occur.

I claim:

1. A drip pan for attachment to the underside of a motor vehicle, comprising:

a pan with a bottom and an upstanding rim; and a removable layer of filter material disposed adjacent the bottom of the pan, the filter material formed of nylon fibers having the property of retaining oils while shedding water.

2. A drip pan according to claim 1 together with a perforated screen in the pan overlying the filter material.

3. A drip pan according to claim 1 wherein the filter material is a nylon flannel.

4. A drip pan according to claim 1 together with brackets for attaching the pan to the vehicle.

5. A drip pan for attachment to the underside of a motor vehicle, comprising:

an open top box; and a removable layer of fibrous nylon filter material mounted in the box, the filter material having the property of retaining oils but releasing water.

* * * * *